US007797196B1

(12) United States Patent (10) Patent No.: US 7,797,196 B1
Aaron et al. (45) Date of Patent: Sep. 14, 2010

(54) METHOD, SYSTEM, AND STORAGE MEDIUM FOR PROVIDING AUTOMATED PURCHASING AND DELIVERY SERVICES

(75) Inventors: Jeffrey Aaron, Atlanta, GA (US); Jason Collins, Springfield, VA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1387 days.

(21) Appl. No.: 10/689,133

(22) Filed: Oct. 20, 2003

(51) Int. Cl.
  *G06Q 30/00* (2006.01)
(52) U.S. Cl. ...................................... 705/26
(58) Field of Classification Search .................. 705/26, 705/27
  See application file for complete search history.

(56) References Cited

U.S. PATENT DOCUMENTS

| | | | | |
|---|---|---|---|---|
| 5,974,396 | A * | 10/1999 | Anderson et al. | 705/10 |
| 6,061,682 | A * | 5/2000 | Agrawal et al. | 707/6 |
| 6,204,763 | B1 * | 3/2001 | Sone | 340/568.1 |
| 6,850,899 | B1 * | 2/2005 | Chow et al. | 705/26 |
| 6,925,441 | B1 * | 8/2005 | Jones et al. | 705/10 |
| 7,007,020 | B1 * | 2/2006 | Chen et al. | 707/6 |
| 7,353,194 | B1 * | 4/2008 | Kerker et al. | 705/29 |
| 2001/0011222 | A1 * | 8/2001 | McLauchlin et al. | 705/1 |
| 2001/0037259 | A1 * | 11/2001 | Sharma et al. | 705/26 |
| 2001/0051905 | A1 * | 12/2001 | Lucas | 705/29 |
| 2002/0046093 | A1 * | 4/2002 | Miller et al. | 705/14 |
| 2002/0091576 | A1 * | 7/2002 | Giordano et al. | 705/26 |
| 2002/0120712 | A1 * | 8/2002 | Maislin | 709/217 |
| 2002/0152128 | A1 * | 10/2002 | Walch et al. | 705/26 |
| 2002/0174030 | A1 * | 11/2002 | Praisner et al. | 705/26 |
| 2003/0018536 | A1 * | 1/2003 | Eggebraaten et al. | 705/26 |
| 2003/0158855 | A1 * | 8/2003 | Farnham et al. | 707/102 |
| 2004/0259536 | A1 * | 12/2004 | Keskar et al. | 455/418 |

OTHER PUBLICATIONS

Unknown author, "Marcam Solutions Delivers Advanced Customer Order Management With Release of Protean 3.0," Business Wire, New York, Jun. 30, 1998, p. 1.*
Unknown author, "Industrial Manufacturer Wavin Turns Back Office Systems Into Customer and Partner-Facing Solutions With Blue Martini Software," PR Newswire, Sep. 24, 2002.*

* cited by examiner

*Primary Examiner*—Amee A Shah
(74) *Attorney, Agent, or Firm*—Cantor Colburn LLP

(57) ABSTRACT

Embodiments of the invention relate to a method, system, and storage medium for providing automated purchasing and delivery services. The method includes performing analysis of electronic activities conducted by a network user, inferring an intent to execute a transaction by the network user, and executing the transaction on behalf of the network user. The analysis includes comparing the electronic activities with previously-conducted electronic activities, and applying user-defined policies to the electronic activities.

20 Claims, 2 Drawing Sheets

METHOD, SYSTEM, AND STORAGE MEDIUM FOR PROVIDING AUTOMATED PURCHASING AND DELIVERY SERVICES

BACKGROUND OF THE INVENTION

The present invention relates generally to electronic business transactions, and more particularly, the invention relates to a method, system, and storage medium for providing automatic electronic purchasing and delivery of products and services.

Electronic business (e-business) transactions are often conducted by consumers over a network such as the Internet. These e-business activities include buying goods and services, among other functions. Oftentimes a purchase or transaction is recurrent as in the case where a consumer orders flowers to celebrate an occasion such as a birthday, anniversary, or other annual event. Another example might be an avid book collector who anticipates the release of each new novel by a favorite author by reserving a copy of the book online before its actual release date. In a business context, a recurrent transaction might include scheduling a network conference for individuals in which the scheduling individual or organization pays for the network time and utilities from a third party source.

In order to effectuate these e-business transactions, the consumer must take active and repetitive steps to complete the purchase for each purchasing instance. For example, to purchase flowers, a consumer needs to access a florist web site, peruse a catalog of selections, identify the purchase, and enter personal information including credit card data and address information. The next time the customer desires to make a purchase at this website, at least a portion of this information must be re-entered by the customer. There are times when recurrent purchasing activities may be inferred based upon previous purchasing activities and scheduling events or organizing information located within the customer's electronic calendar or personal information manager (PIM).

What is needed, therefore, is a way to automate frequently occurring purchases over a network via an electronic system.

SUMMARY OF THE INVENTION

Embodiments of the invention relate to a method, system, and storage medium for providing automated purchasing and delivery services. The method includes performing analysis of electronic activities conducted by a network user, inferring an intent to execute a transaction by the network user, and executing the transaction on behalf of the network user. The analysis includes comparing the electronic activities with previously conducted electronic activities, and applying user-defined policies to the electronic activities.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several figures.

DETAILED DESCRIPTION OF THE INVENTION

Figure 1:
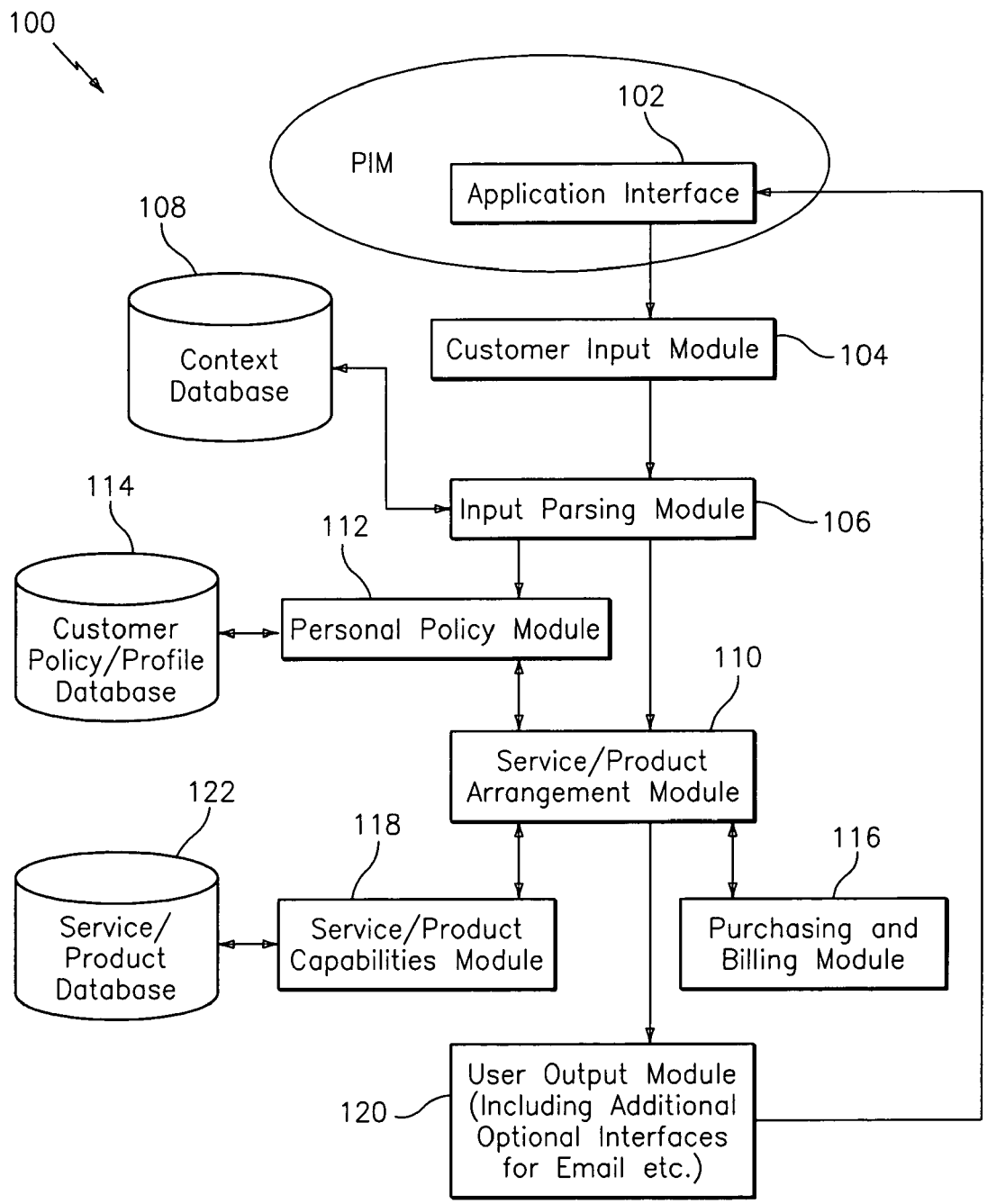
FIG. 1 is a block diagram of a system upon which the purchasing system is implemented in an exemplary embodiment.

The automated electronic services provided in system 100 of the invention offer an electronic solution to recurrent purchasing activities. Purchases are inferred based upon previous purchasing activities and customer prescribed preferences whereby no explicit purchasing action is required by the customer. While embodiments described herein include a PIM-based electronic calendar that incorporates the features of the purchasing system directly within the calendar program, it will be understood that other applications may be used to implement the purchasing system, or alternatively, the purchasing system may be executed as a stand-alone application. The customer can schedule activities that are typically associated with a PIM such as meeting dates, holidays, social events, etc. Any electronic purchasing activity is tracked by the purchasing system and, together with the scheduled events, anticipates future purchasing activities.

System 100 includes an application programming interface 102 associated with a computer device operated by a network user, and a purchasing system including modules and databases 104-122 as described herein.

Application interface 102 refers to a network user's interface into the purchasing system and may be implemented as a modification to an existing commercial application interface such as Microsoft Outlook™. Moreover, any number of existing applications may be used, such as those built using application programming interfaces (APIs), either open or proprietary. The automated purchasing system may be implemented as a plug-in to these applications, or more generally to any suitably implemented application. Various electronic activities conducted by a network user may be performed via the application programming interface 102. Such electronic activities include: accessing a web site; performing a detectable action on a web page; drafting an email; searching a web-based electronic search engine; accessing a personal information calendar; entering a new task or accessing an existing task in an electronic task folder; and creating, editing, or viewing a document. Performing a detectable action on a web page refers to accessing one or more web pages on a web site, clicking on items within the pages or pop-ups within the web site, as well as filling out any web forms or any other action that might indicate or imply a user intent, such as running any javascript, ActiveX, or other embedded program code.

Customer input module 104 adapts the data provided by application interface 102 to the input parsing module 106. It collects pertinent inputs from application interface 102 and makes the correct calls to the input parsing module with that input information.

Input parsing module 106 receives the input from customer input module 104 and interprets it using information stored in context database 108. The purchasing system compares electronic activities (through the data provided via customer input module 104) with previously-conducted electronic activities (stored in context database 108). The output of input parsing module 106 includes a suggested course of action for the service/product arrangement module 110. Further, if input parsing module 106 detects a required change to personal policy module 112, it modifies the policy accordingly.

Context database 108 stores information that describes previously conducted activities performed by a network user, such as the occurrence of a meeting, along with parameters, such as the number of participants, meeting location, meeting resources and materials, and time of day. Other previously-conducted activities may include a web site search, an electronic purchase, an email message received or transmitted by the network user, a calendar item generated or accessed by the network user, and a task item generated or accessed by the network user. Context database 108 receives parsed data from input parsing module 106 and stores the data for future analysis. For example, a network user accesses a web page and the data parsed from this activity is transmitted to context database 108 and used during future analyses and determining a purchasing inference. Other network user activities tracked and stored in context database 108 may include keystrokes, mouse clicks, and other actions.

Service/product arrangement module 110 facilitates the selection of resources related to a specific transaction. For example, if a multi-party conference call has been scheduled, the service/product arrangement module 110 looks for associated resources typically used by the scheduling individual. These resources can be determined by looking at past transactions or by mapping related resources using business rules created via the purchasing system. Associated resources may include audio/video equipment, a white board, easel, or similar presentation materials, etc.

Personal policy module 112 allows a user to customize transaction policies and rules. The user can set limits on the frequency of a transaction or purchase and may specify conditions for implementing such transactions. For example, the user may be operating within a monthly budget of $5,000. Policies may include placing an upper limit on an amount of money that is authorized to be spent on a transaction, placing a time limit on when a transaction may be executed, stipulate authorized vendors, suppliers, or entities through which a transaction may be entered, and specifying delivery options for items and services associated with a transaction. A policy may be established by the user via personal policy module 112 that authorizes the purchasing system to automatically implement purchases up to that monthly dollar limit.

Customer policy/profile database 114 stores policies and rules set by a user and also stores discount options and packages that may be generated by the purchasing system for individuals or organizations that provide discounts and incentives for marketing purposes. Customer policy/profile database 114 may also store personal information relating to the customer such as customer name, address, credit card account information, special delivery options, etc. Delivery options may be specifically provided by the customer via personal policy module 112 or may be inferred based upon previously conducted activities stored in context database 108.

Purchasing and billing module 116 interacts with service/product arrangement module 110 to execute purchases on behalf of an individual or organization. Transactions include an associated pricing structure that is used to generate electronic invoices to be transmitted to the purchasing individual.

Service/product capabilities module 118 uses product and service data stored in service/product database 122 to validate and ensure that resources desired by an individual are available and are compatible with other resources before bundling or grouping the resources into a package or offering them to the individual.

Service/product database 122 stores information pertaining to all available products and/or services provided by the purchasing system. Products and services may include anything available that can be purchased or bartered. An example of a service is an audio bridge service, which may be automatically purchased via the purchasing system acting on a network user's actions to schedule a conference call into a PIM electronic calendar.

User output module 120 provides appropriate notification or feedback to the user that an action was taken or a purchase was made. It may do this via the application programming interface 102, wherein the notification or feedback is presented to the user via the commercial application itself (e.g., Microsoft Outlook™) or via any other feasible method such as email, pager, computer-generated voice message via telephone, a mobile device, or instant message (in which case the corresponding interfaces would be incorporated into the system). The user output module may also provide a method to request additional information or permission from the user at any point in the process.

Figure 2:
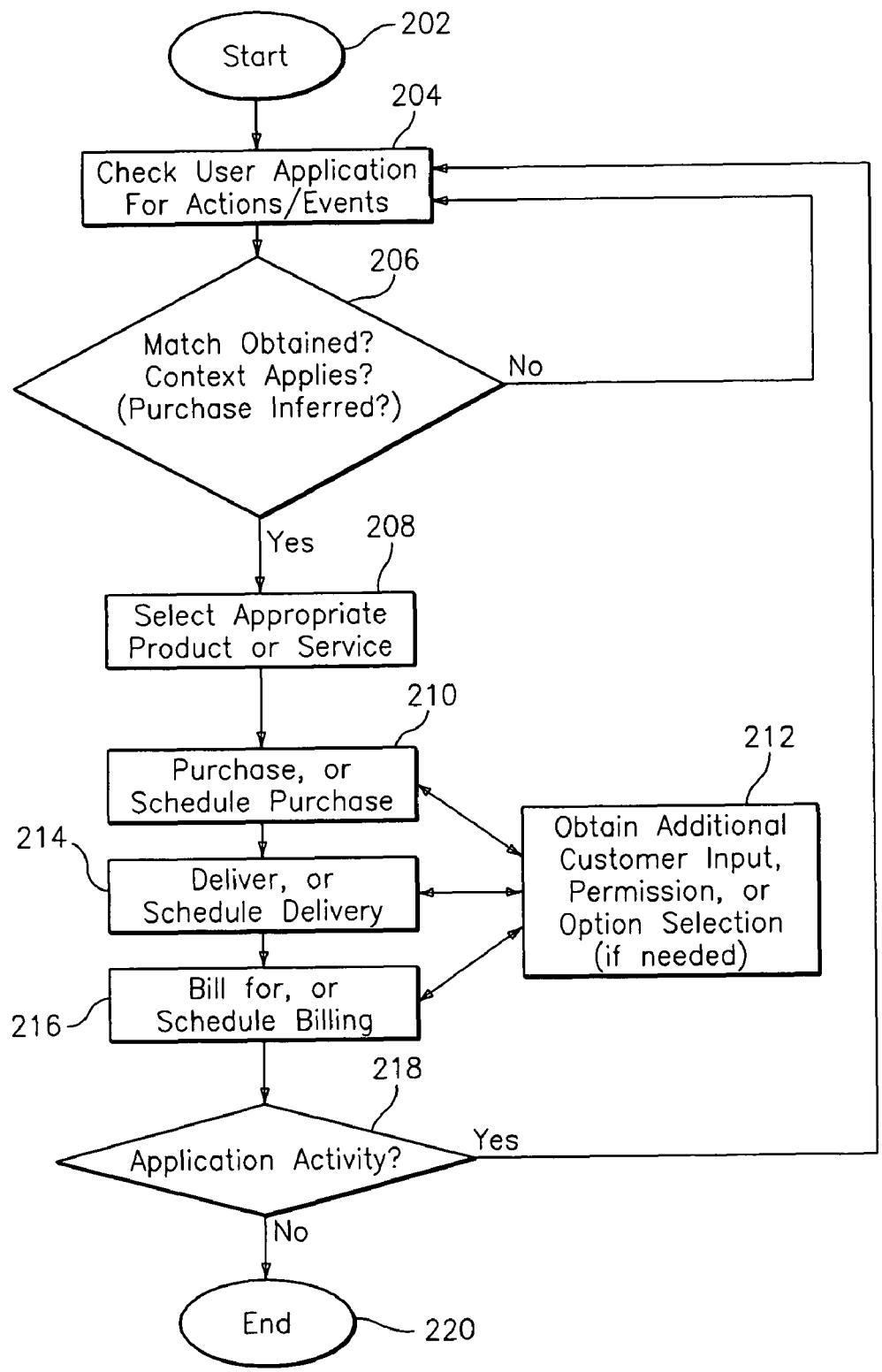
FIG. 2 is a flowchart describing the process of implementing the purchasing system in an exemplary embodiment.

As indicated above, the purchasing system allows for automatic purchasing of products and services based upon policy decisions established by the individual or organization and past activities. FIG. 2 describes the process of implementing the automated purchasing system.

The process begins at step 202 whereby the automated purchasing system examines application activities conducted by a network user at step 204. This is accomplished via data input received via application interface 102 and adapted via customer input module 104. The activities conducted by the user are parsed and compared to data stored in context database 108 to determine whether a match exists and whether the personal policy rules established by the network user are in conformance with the inferred purchase at step 206. Step 206 is accomplished by the input parsing module 106, context database 108, service/product arrangement module 110, personal policy module 112, and customer policy/profile database 114 as described in FIG. 1. If no matches have been found at step 206, or alternatively, if the personal policy rules are not in conformance with the inferred purchase, the process reverts to step 204 where further evaluation of network user activities is performed.

If a match exists and personal policy rules are not in conflict at step 206, the product or service is selected at step 208. The service/product arrangement module 110 is used to determine whether additional resources related to the transaction are needed. An intent to execute a transaction is inferred by the purchasing system and a purchase transaction is initiated or scheduled at step 210. Step 210 utilizes customer policy/profile database 114, purchasing and billing module 116, service/product capabilities module 118, and service/product database 122. If additional information is necessary, the automated purchasing system contacts the network user at step 212. Otherwise, delivery options are ascertained at step 214 and a bill is generated or scheduled for generation at step 216. Step 216 likewise utilizes customer policy/profile database 114, purchasing and billing module 116, service/product capabilities module 118, and service/product database 122. During the process recited in steps 214 and 216, additional input of the network user may be sought if necessary. Notification to the user that an action was taken or a purchase was made can be provided at either of steps 214 or 216, as described previously via the user output module 120. Examples of notification include that a purchase was made or scheduled (which would occur during step 214) and that a bill was sent or a debit was made (which would occur during step 216).

Once the purchase has been executed, the automated purchasing activity continues to check for application activity conducted by the network user at step 218. Step 218 utilizes data input received via application interface 102 and customer input module 104. If no additional activity has occurred, the process ends at step 220.

As indicated above, the automated purchasing system receives inputs from a user that are entered into a PIM and produces profiles on products and services to be purchased and arranged by the purchasing system's service capabilities module 118. This may be via a set-up screen or similar method. The purchasing system structure integrates available electronic or Internet resources with PIM activities such as calendaring and organizing activities, and is applicable to any traditional PIM functions such as task management, project management, to-do lists, e-mail and messaging, etc. Personal information gathered via the purchasing system is protected via security mechanisms integrated within the structure and processes of the invention, such as encryption of information stored in the databases and authenticated and encrypted electronic communications as are well-known to those skilled in the art.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for automating recurrent electronic transactions conducted over a network, comprising:

gathering, by a purchasing system, data from an application executing on a computer device in response to electronic activities conducted by a network user of the computer device, the electronic activities subject to the gathering comprising accessing a web site, performing a detectable user action on a web page, drafting an email, searching a web-based electronic search engine, entering a new task or accessing an existing task in an electronic task folder, and creating, editing, or viewing a document; wherein the data gathered includes data collected in response to each of the electronic activities conducted by the network user;

performing, via the purchasing system, analysis of the electronic activities, the analysis including:

comparing the electronic activities with previously-conducted electronic activities by the network user;

applying policies defined by the network user to the electronic activities; and determining whether the policies defined by the network user are in conflict with the transaction;

the purchasing system inferring an intent to execute a transaction by the network user, the inference based upon results of the analysis and absent any explicit action by the network user to execute the transaction; and the purchasing system automatically executing the transaction on behalf of the network user upon determining the policies defined by the network user are not in conflict with the transaction, the automatically executing the transaction including executing a purchase of a service/product on behalf of the network user.

2. The method of claim 1, wherein the comparing the electronic activities with previously-conducted electronic activities further comprises:

collecting data entered by the network user;

parsing the data by comparing the data to data stored in a database in communication with the purchasing system that contains the previously-conducted electronic activities, the parsing resulting in a suggested electronic transaction for execution;

searching the database for related resources associated with the suggested electronic transaction; and searching a profile database in communication with the purchasing system, the profile database storing policies and rules created by the network user, the policies and rules specifying conditions for authorizing and executing the suggested electronic transaction;

wherein the policies and rules include:

placing an upper limit on an amount of money that is authorized to be spent on a transaction;

placing a time limit on when a transaction may be executed;

prescribing authorized vendors, suppliers, or entities through which a transaction may be entered; and specifying delivery options for items and services associated with a transaction.

3. The method of claim 2, further comprising:

the purchasing system searching a service/product database in communication with the purchasing system to ensure the items and services associated with the transaction are available.

4. The method of claim 2, further comprising:

the purchasing system searching a service/product database in communication with the purchasing system to ensure that the items and services associated with the transaction are compatible with the transaction.

5. The method of claim 1, further comprising:

the purchasing system generating an electronic invoice upon execution of the transaction and notifying the network user that the transaction has been completed.

6. The method of claim 5, wherein the notification is sent via at least one of:

an application programming interface of the computer device;

an email program on the computer device;

a pager;

a telephone call via a voice network;

a computer-generated voice messaging system over a telephone line;

a call on a mobile wireless device;

a personal digital assistant; and an instant message program.

7. The method of claim 1, wherein the electronic activities conducted by the network user include accessing a personal information calendar.

8. The method of claim 7, wherein the previously-conducted electronic activities include:
an occurrence of a meeting scheduled into the personal information calendar and including parameters comprising:
a number of participants;
a meeting location;
a time of day; and
meeting resources and materials;
a web site search;
an electronic purchase;
an email message received or transmitted by the network user;
a calendar item generated or accessed by the network user; and
a task item generated or accessed by the network user.

9. A non-transitory storage medium comprising machine-readable computer program code for automating recurrent electronic transactions conducted over a network, the storage medium including instructions for causing a computer to implement a method comprising:
gathering, by a purchasing system, data from an application executing on a computer device in response to electronic activities conducted by a network user of the computer device, the electronic activities subject to the gathering comprising accessing a web site, performing a detectable user action on a web page, drafting an email, searching a web-based electronic search engine, accessing a personal information calendar, entering a new task or accessing an existing task in an electronic task folder, and creating, editing, or viewing a document; wherein the data gathered includes data collected in response to each of the electronic activities conducted by the network user;
performing analysis of the electronic activities, the analysis including:
comparing the electronic activities with previously-conducted electronic activities by the network user;
applying policies defined by the network user to the electronic activities; and
determining whether the policies defined by the network user are in conflict with the transaction;
inferring an intent to execute a transaction by the network user, the inference based upon results of the analysis and absent any explicit action by the network user to execute the transaction; and
executing the transaction on behalf of the network user upon determining the policies defined by the network user are not in conflict with the transaction, the automatically executing the transaction including executing a purchase of a service/product on behalf of the network user.

10. The storage medium of claim 9, wherein the comparing the electronic activities with previously-conducted electronic activities further comprises:
collecting data entered by the network user;
parsing the data by comparing the data to data stored in a database containing the previously-conducted electronic activities, the parsing resulting in a suggested electronic transaction for execution;
searching the database for related resources associated with the suggested electronic transaction; and
searching a profile database storing policies and rules created by the network user, the policies and rules operable for specifying conditions for authorizing and executing the suggested electronic transaction;
wherein the policies and rules include:
placing an upper limit on an amount of money that is authorized to be spent on a transaction;
placing a time limit on when a transaction may be executed;
prescribing authorized vendors, suppliers, or entities through which a transaction may be entered; and
specifying delivery options for items and services associated with a transaction.

11. The storage medium of claim 10, further comprising instructions for causing the computer to implement:
searching a service/product database to ensure the items and services associated with the transaction are available.

12. The storage medium of claim 10, further comprising instructions for causing the computer to implement:
searching a service/product database to ensure that the items and services associated with the transaction are compatible with the transaction;
generating an electronic invoice upon execution of the transaction; and
notifying the network user that the transaction has been completed.

13. The storage medium of claim 12, wherein the notification is sent via an application programming interface.

14. The storage medium of claim 12, wherein the notification is sent via at least one of:
an email program on a computer device;
a pager;
a telephone call via a voice network;
a computer-generated voice messaging system over a telephone line;
a call on a mobile wireless device;
a personal digital assistant; and
an instant message program.

15. The storage medium of claim 9, wherein the previously-conducted electronic activities include at least one of:
an occurrence of a meeting including parameters comprising:
a number of participants;
a meeting location;
a time of day; and
meeting resources and materials;
a web site search;
an electronic purchase;
an email message received or transmitted by the network user;
a calendar item generated or accessed by the network user; and
a task item generated or accessed by the network user.

16. A system for automating recurrent electronic transactions conducted over a network, comprising:
a computer system; and
a purchasing system executed via the computer system, the purchasing system implementing a method, comprising:
gathering data from an application executing on a computer device in response to electronic activities conducted by a network user of the computer device, the electronic activities subject to the gathering comprising accessing a web site, performing a detectable user action on a web page, drafting an email, searching a web-based electronic search engine, accessing a personal information calendar, entering a new task or accessing an existing task in an electronic task folder, and creating, editing, or viewing a document; wherein the data gathered includes data collected in response to each of the electronic activities conducted by the network user;

performing analysis of the electronic activities, the analysis including:

comparing the electronic activities with previously-conducted electronic activities by the network user;

applying policies defined by the network user to the electronic activities; and determining whether the policies defined by the network user are in conflict with the transaction;

inferring an intent to execute a transaction by the network user, the inference based upon results of the analysis and absent any explicit action by the network user to execute the transaction; and automatically executing the transaction on behalf of the network user upon determining the policies defined by the network user are not in conflict with the transaction, the automatically executing the transaction including executing a purchase of a service/product on behalf of the network user.

17. The system of claim 16, wherein comparing the electronic activities with previously-conducted electronic activities further comprises:

collecting data entered by the network user;

parsing the data by comparing the data to data stored in a database containing the previously-conducted electronic activities, the parsing resulting in a suggested electronic transaction for execution;

searching the database for related resources associated with the suggested electronic transaction; and searching a profile database storing policies and rules created by the network user, the policies and rules operable for specifying conditions for authorizing and executing the suggested electronic transaction;

wherein the policies and rules include:

placing an upper limit on an amount of money that is authorized to be spent on a transaction;

placing a time limit on when a transaction may be executed;

prescribing authorized vendors, suppliers, or entities through which a transaction may be entered; and specifying delivery options for items and services associated with a transaction.

18. The system of claim 17, wherein the purchasing system further performs:

searching a service/product database to ensure the items and services associated with the transaction are available; and searching a service/product database to ensure that the items and services associated with the transaction are compatible with the transaction.

19. The system of claim 16, wherein the purchasing system is executed via an application programming interface on the network computer.

20. The system of claim 16, wherein the previously-conducted electronic activities include at least one of:

an occurrence of a meeting including parameters comprising:

a number of participants;

a meeting location;

a time of day; and meeting resources and materials;

a web site search;

an electronic purchase;

an email message received or transmitted by the network user;

a calendar item generated or accessed by the network user; and a task item generated or accessed by the network user.

* * * * *